Feb. 7, 1928.
H. STROHBACH
1,658,579
APPARATUS FOR BREWING COFFEE
Filed July 24, 1926   2 Sheets-Sheet 1
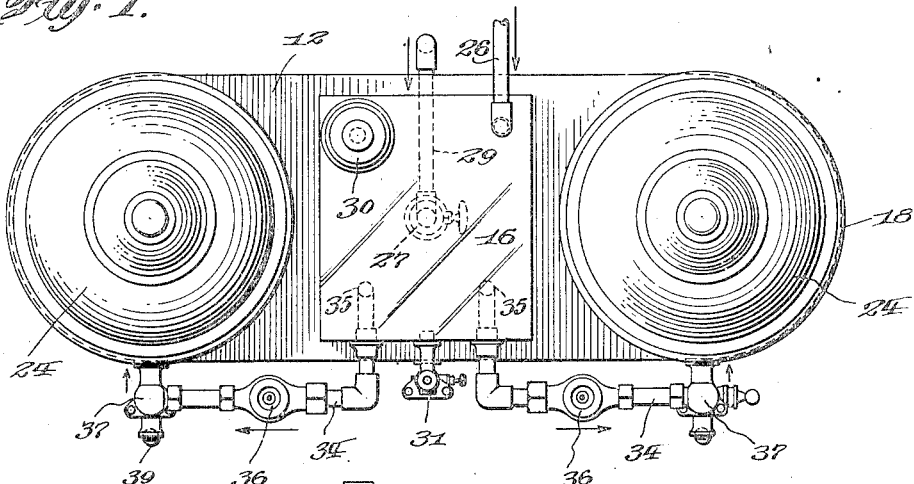
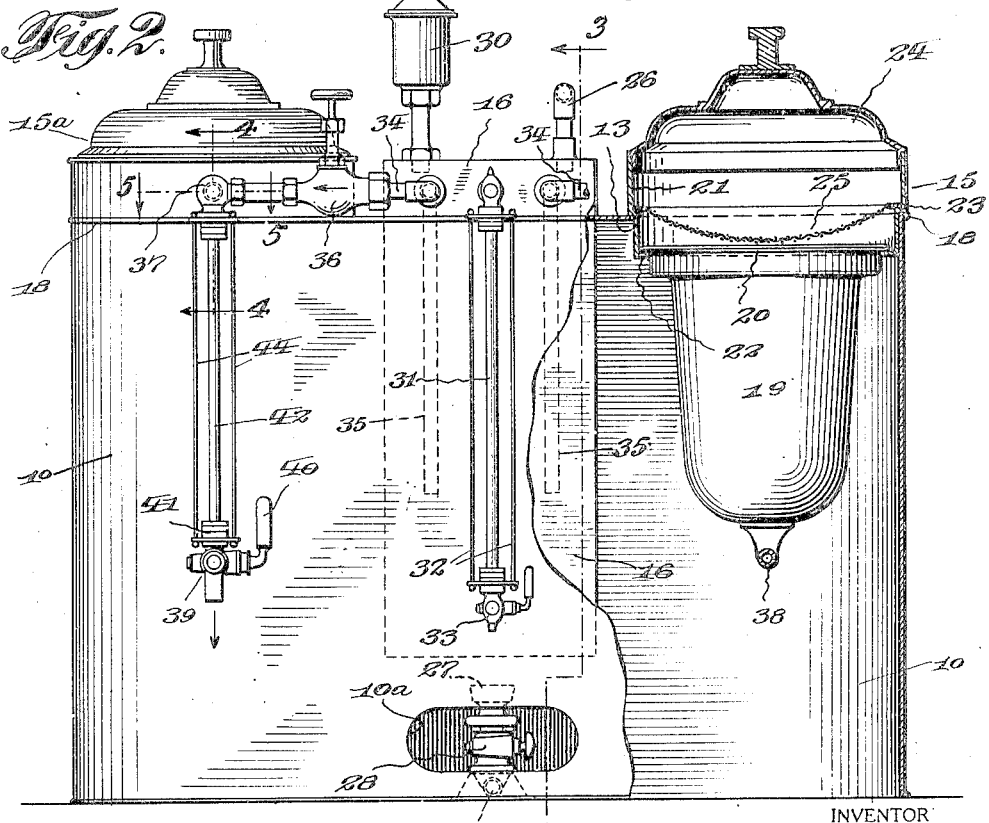
INVENTOR
Henry Strohbach
BY
F. V. Winters
his ATTORNEY

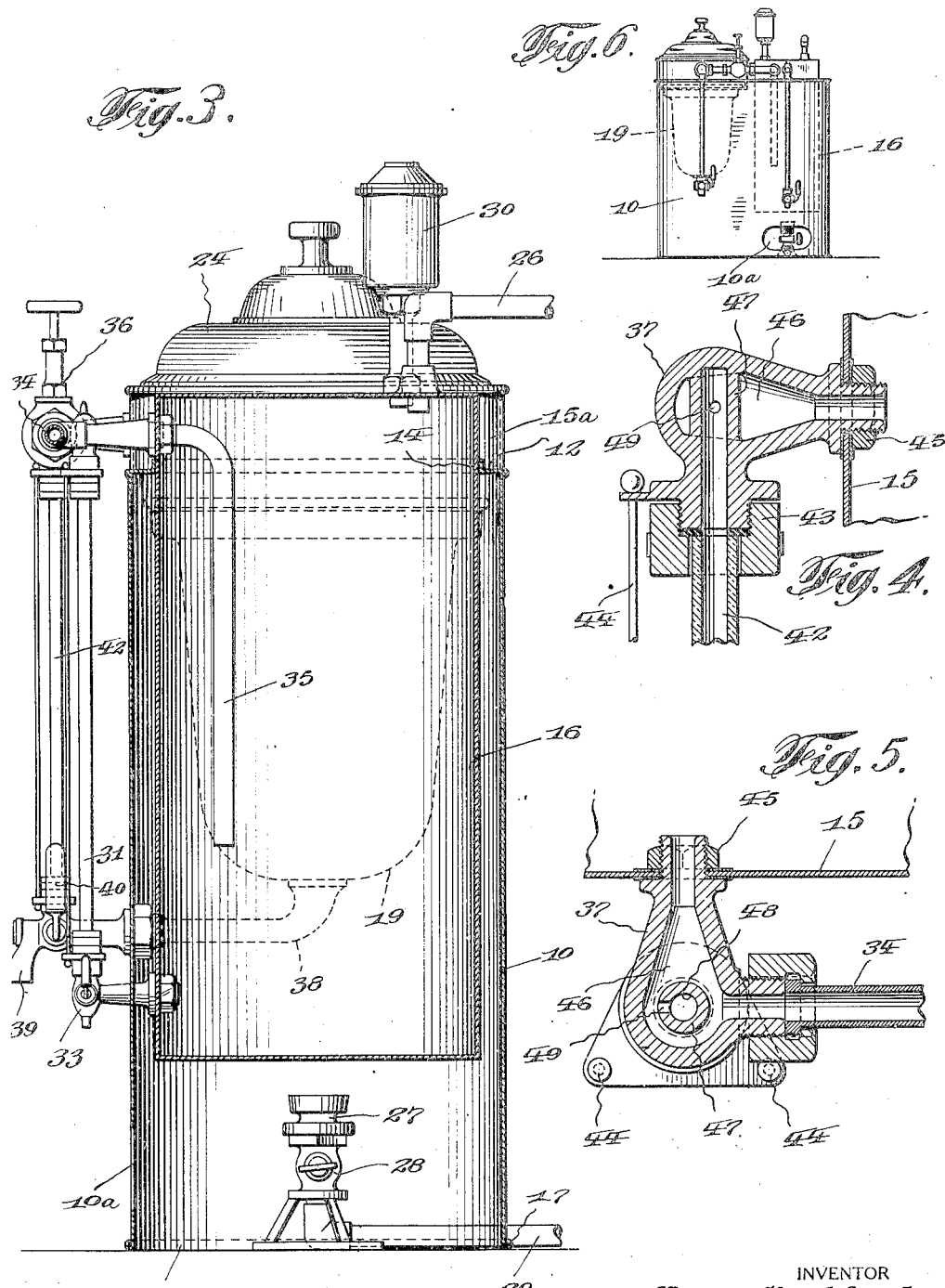

Patented Feb. 7, 1928.

1,658,579

UNITED STATES PATENT OFFICE.

HENRY STROHBACH, OF NEW YORK, N. Y.

APPARATUS FOR BREWING COFFEE.

Application filed July 24, 1926. Serial No. 124,660.

This invention relates to improvements in apparatus for brewing coffee and the primary object of the invention is the provision of a unitary structure containing a plurality of coffee urns and thus dispensing with the necessity of furnishing an inclosing shell for each urn, all of which resulting in the production of a neat and compact arrangement readily accessible to the operator.

Another object resides in the provision of means for preheating a quantity of water to a suitable degree of temperature prior to its contact with the unbrewed coffee, the heating means being positioned at a point remote from the coffee yet maintained at a suitable temperature by the heat confined within the casing and radiated from the source of heat.

Another object is to provide means for supplying water to the heater and further communicating means for supplying the heated water to the unbrewed coffee, in a predetermined quantity.

A still further object resides in the provision of visual means wherein the quantity of water in the heater and similarly the height of the brewed coffee in the urns may be readily observed.

Still another object of the invention is the production of an apparatus that may be easily disassembled to effect certain cleansing operations and thus one is assured of producing drink for human consumption from a sanitary apparatus.

Another feature of the invention resides in the provision of certain conduits and by-passes wherein the coffee within certain gauge glasses may be drained or flooded to assure a correct and accurate indication of the level of the coffee in the urns.

Other advantages and features flowing from the use of my apparatus will become quite evident when considered in the light of the description about to follow and in order that the same may be better understood reference is had to the accompanying drawings forming a part thereof.

In said drawings:

Figure 1 is a plan view of my improved apparatus, certain arrows being shown to illustrate the general course of the water before and after the application of heat.

Fig. 2 is a side elevation of the same, the casing in this instance being broken away and one of the urns being shown in central section to clearly illustrate its construction.

Fig. 3 is a vertical transverse sectional view, slightly enlarged, and taken substantially on the line 3—3 of Fig. 2.

Fig. 4 is a sectional detail, slightly enlarged, and viewed on the line 4—4 of Fig. 2.

Fig. 5 is a similar section but in this instance is taken at right angles to Fig. 4 and substantially on the line 5—5 of Fig. 2; and Fig. 6 is an elevation of a slightly modified form and embodying but a single urn.

Those skilled in the art to which this invention appertains are aware that under the modern construction of lunch rooms, especially where modern appliances permit the location of the food-preparing portion within the dining or lunch room, that space is somewhat a consideration and since so many public eating places are cafeteria in nature it is not infrequent that a single operator or chef is employed to attend to the wants of the patrons. So far as I am aware it is the custom to mount two or three coffee urns with separable hot water supplying means at a point more or less accessible to the chef and it is quite obvious that this necessitates the use of a goodly quantity of piping and heat supplying means requiring more or less care and time which might be employed to better advantage.

Therefore I propose to produce a coffee brewing apparatus that will require but a small amount of space, the coffee brewing urns thereof being supplied with hot water from a single boiler, and to provide means compactly arranged in order that the condition of the water before and after its conversion into coffee may be controlled at will and its condition in the apparatus readily ascertained.

To further carry out the objects and advantages mentioned hereinbefore my apparatus is designed to embody a main casing 10 having its bottom open as indicated at 11, (Fig. 3), and its top 12 inclosing the major portion of its area, with the exception of end apertures 13 and a central aperture 14, the former aperture being designed to receive the coffee urns designated generally by the numerals 15 and 15ª while the latter is adapted for the reception of a container or boiler 16. As observed in Fig. 1 the casing 10 has its longitudinal sides parallel and at the ends they are rounded to form a part of the urns. To summarize briefly the construction of the casing, it may be said it embodies a single sheet of material first formed as indicated in Fig. 1, having an open bottom and a top with three apertures as noted above. The bottom edge of the case 10 is preferably rolled upon a reinforcing wire to form the foot portion 17 while its top edge may be formed with a beading 18.

One portion of the apparatus for preparing the coffee has been designated by the numeral 15 and termed an urn, said apparatus comprising a pot 19 having a flanged portion 20 and depending from the vessel 21 through the medium of the inturned flange 22 of the latter. Said vessel 21 is reduced in diameter intermediate its depth to form a shoulder 23 which abuts the top of the casing, the reduced portion of said vessel 21 fitting in the aperture 13 and is thus supported in the depending portion clearly shown in Fig. 2. A cover 24 is provided, dome-like in arrangement in order to catch any water of condensation and deposit same into the pot. As will be readily understood the necessary coffee is placed in a perforated container 25 to await the introduction of the hot water.

The coffee urns are similar in construction hence a detailed description of one will suffice for the others; however, in order that description may be clearly understood I prefer to designate one of the urns by the numeral 15 and its companion as 15ª and during the remainder of the description and the operation of the apparatus they will be so referred to.

The means for heating a supply of water comprises the container 16 which is supported by the top of said casing and extends for its major length within the same, the portion protruding from the top is exceedingly small and is intended for the connection of certain conduits as will be now pointed out, and obviously the water in the container will be little if any effected by this small portion protruding from the top of the casing. I prefer to conduct water to said casing through the medium of a pipe 26 leading from a suitable water supply (not shown) and entering said container or boiler 16 at the top thereof while heat is supplied through the intermediary of a burner 27 positioned below the boiler and controlled by a valve 28 in the supply line 29. For the sake of safety I prefer to provide the boiler with a valve 30 carried by the top of said boiler and of standard construction to effect the flowing off of steam should the pressure in the boiler reach a dangerous point. Obviously other means might be provided in the form of a pressure gauge but such instruments require occasional observation and since the safety valve 30 is automatic in action I reduce the hazards just one point less.

The front face of the casing is in communication with a liquid level indicator in the form of a gauge glass 31 which is connected in the usual manner to the top and bottom of said container and provided with the protecting rods 32 and draining valve 33, all of which are more or less standard in construction.

The connections between the boiler 16 and the urns 15 and 15ª is effected through the medium of the pipes 34, one end thereof entering the boiler 16 above the top 12 of the casing 10 and extending downwardly into the boiler 16 as indicated at 35 (see Fig. 3). Valves 36 are interposed in the pipes 34 and finally a connection is made with the fittings 37 in direct communication with each of the urns 15 and 15ª, and thus the supply of hot water may be regulated by means of the valves 36. As shown in Figs. 2 and 3 each of the pots 19 is provided with an outlet conduit 38 which extends laterally to the front of the casing and is here provided with outlet means 39 in the form of a faucet operable by means of the handle 40. Said faucet 39 is provided with a suitable extension 41 to receive the lower end of a gauge glass 42 the upper end of said glass being secured to the fitting 37 through the medium of a packing nut 43, as shown in Fig. 4, and in order to protect the glass the usual rods 44 are positioned laterally thereof.

I now direct particular attention to the fitting 37 which is shown in detail in Figs. 4 and 5 and in these figures it will be noted that said fitting is connected to the part 13 by means of nuts 45 and that suitable packing is provided to effect a water tight connection and further said fitting is cored, as indicated at 46, to provide a circular and somewhat elongated passage and defining a stem-like structure 47 having an axial bore 48 communicating with the gauge glass 42; communication between said axial bore 48 and the interior of the fitting 37 being effected by means of a side port 49.

As shown in Figs. 2 and 3 of the drawing the inner lateral end 35 of the pipe 34 extends into the boiler 16 and terminates at a point just above the faucets 39 and by this construction it is evident that a siphoning effect takes place and the boiling water from the boiler 16 is drawn into the urns, but when the level of the hot water in the boiler has reached a point below said pipe 35 such action is destroyed and thus the urns are freed from the danger of overflowing. Upon operating the valves 36 the boiling water enters the fitting 37 and through the port 49 thus filling the gauge glass 42 and in view of the relatively small diameter of said port but a small volume of circulating water can pass to the gauge glass and thus a siphoning effect is created which induces the liquid contents derived from the brewed coffee to pass up through the gauge glass through the conduit 38 and by so doing causes said siphoning effect to further advantage since it re-pours the coffee at the same time the coffee is brewed and thus a circulation of water is effected until the proper color indicating the proper strength of coffee is obtained.

Ordinarily the boiler 16 is filled to a level approximately to the pipe 34 and upon application of heat to said boiler the liquid quickly rises to a boiling point and the space above the water level fills with steam of sufficient pressure upon the surface of said water to force the water up through the pipe 35 and upon opening the valve 36 said water is sprayed upon the unbrewed coffee, as is quite evident and this condition is continued until the level of the water in the heater 16 reaches the lower end of said pipe 35.

The presence of the pots 19 within the casing 10 assures hot coffee therein by reason of the great heat present in the casing and in order that a high temperature may be maintained in said casing I have somewhat enlarged the opening 10ª to permit the dead heat to escape and fresh air to enter thereat and moreover permit the insertion of the hand for igniting said burner 27.

The modification shown in Fig. 6 comprises a casing 10 having the usual air vent 10ª and the pot 19 and boiler 16. The other parts of this modification are similar to my preferred form the only difference being that only one urn is provided.

I claim:

1. Apparatus of the class described embodying a casing, a plurality of urns mounted in said casing, a boiler positioned within said casing and between said urns, heating means for said boiler, said urns and boiler being arranged so the former are indirectly heated by said heating means, a conduit for supplying water to said boiler, valved means establishing communication between said boiler and said urns and extending into the latter and terminating from the bottom thereof, means for indicating the level of the liquid content of said urns, and a fitting in communication with said boiler and urns and embodying an elongated passage and a bore communicating with said indicating means through the intermediary of a port arranged in the interior of said fitting.

2. Apparatus of the class described embodying a casing, having an apertured top portion, a plurality of vessels extending into said apertured top portion and sealing the casing, a plurality of pots depending from said vessels and extending into said casing, a boiler extending into said casing, heating means for said boiler and positioned thereunder and arranged to indirectly heat said pots, a conduit for supplying water to said boiler, valved means comprising a conduit extending a certain distance into said boiler and adapted to extract the water therefrom in a predetermined quantity, means for indicating the level of the liquid content of said pots, and a fitting in communication with said boiler and pots and embodying an elongated passage and a bore communicating with said indicating means through the intermediary of a port arranged in the interior of said fitting.

In testimony whereof I affix my signature.

HENRY STROHBACH.